US011190378B2

(12) United States Patent
Thurmond et al.

(10) Patent No.: US 11,190,378 B2
(45) Date of Patent: Nov. 30, 2021

(54) SENDING INFORMATION SIGNALS ON A DIFFERENTIAL SIGNAL PAIR

(71) Applicant: ClearOne, Inc., Salt Lake City, UT (US)

(72) Inventors: Ed Thurmond, Gainesville, FL (US); Charles Egan, Ocala, FL (US)

(73) Assignee: ClearOne, Inc., Salt Lake City, UT (US)

( * ) Notice: Subject to any disclaimer, the term of this patent is extended or adjusted under 35 U.S.C. 154(b) by 0 days.

(21) Appl. No.: 15/733,318

(22) PCT Filed: Apr. 9, 2019

(86) PCT No.: PCT/IB2019/052909
§ 371 (c)(1),
(2) Date: Jun. 25, 2020

(87) PCT Pub. No.: WO2019/197985
PCT Pub. Date: Oct. 17, 2019

(65) Prior Publication Data
US 2021/0152400 A1    May 20, 2021

Related U.S. Application Data

(60) Provisional application No. 62/654,900, filed on Apr. 9, 2018.

(51) Int. Cl.
*H04L 25/02* (2006.01)
*H04L 25/08* (2006.01)

(52) U.S. Cl.
CPC ........ *H04L 25/0276* (2013.01); *H04L 25/085* (2013.01)

(58) Field of Classification Search
CPC .................. H04L 25/0276; H04L 25/085
See application file for complete search history.

(56) References Cited

U.S. PATENT DOCUMENTS

| 5,199,026 A | 3/1993 | Lund |
| 7,453,292 B2 | 11/2008 | Liu et al. |

(Continued)

FOREIGN PATENT DOCUMENTS

| CN | 111903099 A | 11/2020 |
| WO | WO 2019/197985 A1 | 10/2019 |
| WO | WO 2019/197985 A4 | 10/2019 |

*Primary Examiner* — Kenneth T Lam
(74) *Attorney, Agent, or Firm* — Matthew J Booth PC; Matthew J. Booth

(57) ABSTRACT

This disclosure describes an embodiment of an invention that is sending an information and/or control data signal on a differential signal pair. This embodiment of the apparatus 200 includes an information and/or control data signal 220; a balanced differential signal pair of conductors 212 that includes a positive 202 and a negative 204 differential conductor; a first network of circuits 214 that transforms the information signal 220 into a common mode voltage on the individual conductors 202 and 204 of the balanced differential signal pair of conductors; and a second network of circuits 216 that transforms the common mode voltage on the individual conductors 202 and 204 of the balanced differential signal pair of conductors 212 back to the data signal 222; where the first network of circuits 214 couples to the second network of circuits 216 via the balanced differential signal pair of conductors 202 and 204.

40 Claims, 8 Drawing Sheets

(56) References Cited

U.S. PATENT DOCUMENTS

| | | | |
|---|---|---|---|
| 7,573,254 B2 | 8/2009 | Cobb et al. | |
| 7,812,693 B1 * | 10/2010 | Acimovic | H04B 3/30 |
| | | | 333/204 |
| 8,218,793 B2 | 7/2012 | Tsai et al. | |
| 8,599,966 B2 | 12/2013 | Beukema et al. | |
| 8,638,651 B2 | 1/2014 | Michaelis et al. | |
| 9,106,470 B2 | 8/2015 | Zhao et al. | |
| 2002/0180480 A1 * | 12/2002 | Dreps | H03K 19/018514 |
| | | | 326/62 |
| 2006/0282561 A1 | 12/2006 | Dickens et al. | |
| 2011/0025431 A1 * | 2/2011 | Spiegel | H01Q 3/30 |
| | | | 333/139 |
| 2011/0286612 A1 | 11/2011 | Cooper et al. | |
| 2012/0076325 A1 | 3/2012 | Akino | |
| 2012/0187964 A1 | 7/2012 | Michaelis et al. | |
| 2014/0017956 A1 * | 1/2014 | Hashim | H01R 13/6467 |
| | | | 439/676 |
| 2014/0210520 A1 * | 7/2014 | Harris | H04L 25/0276 |
| | | | 327/108 |

* cited by examiner

SENDING INFORMATION SIGNALS ON A DIFFERENTIAL SIGNAL PAIR

CROSS REFERENCE TO RELATED APPLICATIONS

This application claims priority and the benefits of the earlier filed Provisional Application U.S. No. 62/654,900, filed Apr. 9, 2018, which is incorporated by reference for all purposes into this specification.

TECHNICAL FIELD

This disclosure relates to sending information signals. More specifically, this disclosure relates to sending information signals on a differential signal pair.

BACKGROUND ART

Information and control signals are commonly used in electronic systems to control the state of a device or provide a status indicator of a device's current state or to transmit information from a source to a destination. Typically, these information and control signals use a dedicated wire for each signal and sometimes include an extra wire to act as a ground reference. For cables containing a mix of information signals and communication signals this requires a separate conductor for each information signal and each communication signal. Each conductor represents added cost in the cable and a potential failure point.

Differential pairs are widely used in communication and audio buses to send signals robust to outside interference. These differential pairs allow information to be sent long distances by using the differential voltage between the branches of the pair to determine the state of this information. The common mode voltage on each branch of the pair is ignored. RS485, RS422, LIN bus, CAN bus, Ethernet and balanced audio are all examples of common buses using differential pairs to send information.

FIG. 1 illustrates a prior art schematic of a system 100 that shows a transmission cable 112 with multiple conductors (i.e. wires) 102, 104, 106 used to carry signals. Conductor 102 is the positive leg of the differential signal. Conductor 104 is the negative leg of the differential signal. And conductor 106 is the information or control signal. The transmission cable 112 carries information from device 108 to device 110. Device 108 can be for example a control system with one or more processors, memory, and/or storage that performs some task. Device 110 can be for example another control system, sensor, or the like that may include one or more processors, memory, and/or storage or other type of target devices. Device 108 sends an information signal 120 to transmitter circuit 114. Transmitter circuit 114 converts the information signal into a differential signal and sends the information signal to receiver circuit 116 using transmission cable 112. Receiver circuit 116 receives the differential signal and converts it back to the information signal 122 and sends to device 110.

The information signal in FIG. 1 is "single ended" and more vulnerable to noise introduced via radio frequency interference or conducted interference. In some implementations, there could also be a fourth conductor that carries a ground potential reference against which the other signals are measured to determine their potential difference.

The current technology is described in these references:
PTL 1: USAN 20110286612. Phantom Power Controlled Switch. This patent application describes a method in which a device utilizes an externally applied DC phantom power signal on an additional conductor separate from the conductors used to carry balanced audio to control a switch while isolating balanced audio. When phantom power is applied it activates a relay on the ground conductor to activate a remote switch. The audio isolation is through a transformer. Therefore, this is a method for a Phantom powered device using an extra (fourth) conductor to control a switch on a separate conductor. However, the current disclosure is a method to use balanced signals to send a control signal without an extra conductor. This reference is incorporated by reference for all purposes into this disclosure.

PTL 2: USAN 20120076325 A1. Phantom Power Circuit. This patent is about limiting inrush current when supplying phantom power to a condenser microphone through a detection and limiting circuit present on a third conductor. Unlike the current disclosure, there is no control or information data via the common mode signaling in this reference. This reference is incorporated by reference for all purposes into this disclosure.

PTL 3: U.S. Pat. No. 5,199,026. Token Ring Wiring Concentrator. This patent describes a method for detecting a workstation based on whether a phantom voltage signal is present. Unlike the current disclosure, this reference describes no method of sending or receiving information data via the common mode signaling. This reference is incorporated by reference for all purposes into this disclosure.

PTL 4: U.S. Pat. No. 7,573,254. Systems and methods of identifying patch cord connections in a communications patching system using common mode transmission. This patent discloses a method for patch panels that include port identification circuits that transmit control signals over a phantom mode transmission path to track patch cord connections. In an embodiment disclosed in the patent, a center tap inductor is used to inductively couple the phantom mode signal onto two of the differential pairs in a communications channel. In contrast to the current disclosure, this reference describes no means of sending or receiving information data using a resistive network or center-tapped transformer circuit to superimpose common mode signaling. This reference is incorporated by reference for all purposes into this disclosure.

PTL 5: U.S. Pat. No. 8,638,651. Intelligent patching systems and methods using phantom mode control signals and related communications connectors. This patent relates generally to communications systems and, more particularly, to automatically tracking cabling connections in communications systems. The patent describes a method to include a control signal input circuit configured to capacitively couple a phantom mode control signal onto at least a first and a second of the differential pairs of conductive paths. Unlike the current disclosure, this reference describes no means of sending or receiving information data using a resistive network or center-tapped transformer circuit to superimpose common mode signaling. This reference is incorporated by reference for all purposes into this disclosure.

PTL 6: USAN 20120187964. Plug Insertion Detection Circuits that Sense a Change in Capacitance and Related Methods and Communications Connectors. This patent relates to detecting a plug insertion into a plug aperture of a communications connector provided in which a control signal is received that is electromagnetically coupled across a plug aperture of the communications connector using a reactive coupling element. In contrast to the current disclosure, this patent does not pertain to using sending or receiving control or information data via the common mode signaling. This reference is incorporated by reference for all purposes into this disclosure.

Technical Problem

Information and/or control signals are commonly used in electronic systems to control the state of a device or provide a status indicator of a device's current state or to transmit information from a source to a destination. Typically, these information and control signals use a dedicated wire for each signal. For cables containing a mix of information signals and communication signals this requires a separate conductor for each information signal and each communication signal. Each conductor represents added cost in the cable and a potential failure point.

Solution to Problem

This disclosure provides a unique and distinct way for applying information signals on a transmission cable. What is different and new is that additional conductors are not used to send the information signal. Instead, disclosed embodiments may use a passive resistor network or AC coupling capacitors, center-tapped transformer circuit, or other similar circuit techniques to transform the information signal into a common mode voltage onto each branch of the differential pair in order not to interfere with data being sent over that differential pair.

Advantageous Effects of Invention

The current disclosure has one or more distinguishing features not found in the above references that include: (a) this disclosure uses balanced signals to send a control or information signal without an extra conductor; (b) this disclosure describes a method of sending or receiving control and or information data via the common mode signaling; (c) this disclosure provides for using of two way communication and multiple methods to transfer data; (d) and/or this disclosure provides for using a resistive network or center-tapped transformer circuits to superimpose a common mode signal.

Embodiments of this disclosure have numerous advantages over the prior art that include cost reduction, improved reliability, reduction of space on printed circuit board due to smaller connector, and/or allows the possibility to send any control or information data such as DC logic, PWM, Serial communications, Analog or Digital Modulation.

SUMMARY OF INVENTION

This disclosure describes an apparatus and method of an embodiment of an invention that is sending an information and/or control data signal on a differential signal pair. This embodiment of the apparatus includes information and/or control data signal; a balanced differential signal pair of conductors that includes a positive and a negative differential conductor; a first network of circuits that transform the data signal into a common mode voltage on the individual conductors of the balanced differential signal pair of conductors; and a second network of circuits that transform the common mode voltage on the individual conductors of the balanced differential signal pair of conductors back to the data signal; where the first network of circuits couples to the second network of circuits via the balanced differential signal pair of conductors.

The above embodiment of the invention may include one or more of these additional embodiments that may be combined in any and all combinations with the above embodiment. One embodiment of the invention describes where the first network of circuits and/or the second network of circuits includes a passive resistor network combined with AC coupling capacitors. One embodiment of the invention describes where the first network of circuits and/or the second network of circuits includes a center-tapped transformer. One embodiment of the invention describes where the data signal is a QAM signal. One embodiment of the invention describes where the data signal is a common mode GPIO signal. One embodiment of the invention describes where the first network of circuits and/or the second network of circuits includes a semiconductor device that includes a passive resistor network combined with ac coupling capacitors. One embodiment of the invention describes where the first network of circuits and/or the second network of circuits includes a semiconductor device that includes a center-tapped transformer.

In addition, this disclosure describes an apparatus and method of an embodiment of an invention that is sending information and/or control data signal on a differential signal pair. This embodiment of the apparatus includes an information and/or control data signal; a balanced differential signal pair of conductors that includes a positive and a negative differential conductor; a first means for transforming the data signal into a common mode voltage on the individual conductors of the balanced differential signal pair of conductors; and a second means for transforming the common mode voltage on the individual conductors of the balanced differential signal pair of conductors back to the information signal; where the first means for transforming couples to the second means for transforming via the balanced differential signal pair of conductors.

The above embodiment of the invention may include one or more of these additional embodiments that may be combined in any and all combinations with the above embodiment. One embodiment of the invention describes where the first means for transforming and/or the second means for transforming includes a passive resistor network combined with AC coupling capacitors. One embodiment of the invention describes where the first means for transforming and/or the second means for transforming includes a center-tapped transformer. One embodiment of the invention describes where the data signal is a QAM signal. One embodiment of the invention describes where the data signal is a common mode GPIO signal. One embodiment of the invention describes where the first means for transforming and/or the second means for transforming includes a semiconductor device that includes a passive resistor network combined with ac coupling capacitors. One embodiment of the invention describes where the first means for transforming and/or the second means for transforming includes a semiconductor device that includes a center-tapped transformer.

The present disclosure further describes an apparatus and method of an embodiment of the invention as further described in this disclosure. Other and further aspects and features of the disclosure will be evident from reading the following detailed description of the embodiments, which should illustrate, not limit, the present disclosure.

BRIEF DESCRIPTION OF DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, where identical reference numerals designate the same components. Note that the features illustrated in the drawings are not necessarily drawn to scale. The following is a brief description of the accompanying drawings.

DESCRIPTION OF EMBODIMENTS

Figure 1:
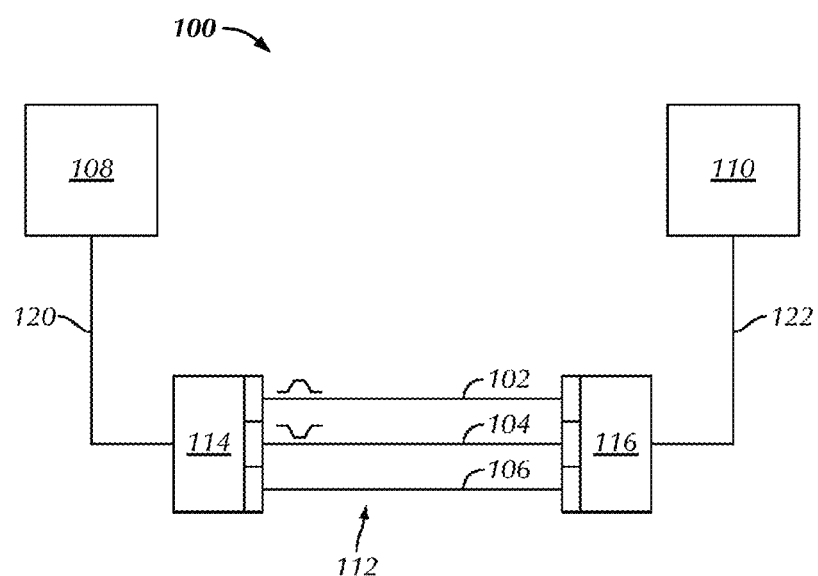
FIG. 1 illustrates a prior art transmission system with a transmission cable with separate paths for information and communication signals.

The disclosed embodiments should describe aspects of the disclosure in sufficient detail to enable a person of ordinary skill in the art to practice the invention. Other embodiments may be utilized, and changes may be made without departing from the disclosure. The following detailed description is not to be taken in a limiting sense, and the present invention is defined only by the included claims.

Specific implementations shown and described are only examples and should not be construed as the only way to implement or partition the present disclosure into functional elements unless specified otherwise in this disclosure. a person of ordinary skill in the art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

In the following description, elements, circuits, and functions may be shown in block diagram form in order not to obscure the present disclosure in unnecessary detail. And block definitions and partitioning of logic between various blocks is exemplary of a specific implementation. It will be readily apparent to a person of ordinary skill in the art that the present disclosure may be practiced by numerous other partitioning solutions. A person of ordinary skill in the art would understand that information and signals may be represented using any of a variety of technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, where the bus may have a variety of bit widths and the present disclosure may be implemented on any number of data signals including a single data signal.

The illustrative functional units include logical blocks, modules, and circuits described in the embodiments disclosed in this disclosure to more particularly emphasize their implementation independence. The functional units may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in this disclosure. A general-purpose processor may be a microprocessor, any conventional processor, controller, microcontroller, or state machine. A general-purpose processor may be considered a special purpose processor while the general-purpose processor is configured to fetch and execute instructions (e.g., software code) stored on a computer readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the illustrative functional units described above may include software or programs such as computer readable instructions that may be described in terms of a process that may be depicted as a flowchart, a flow diagram, a structure diagram, or a block diagram. The process may describe operational acts as a sequential process, many acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several code segments, modules, among different programs, and across several memory devices. Similarly, operational data may be identified and illustrated in this disclosure within modules and may be embodied in any suitable form and organized within any suitable data structure. The operational data may be collected as a single data set or may be distributed over different locations including over different storage devices.

Elements described in this disclosure may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most discussed. For example, where feasible elements in FIG. 1 are designated with a format of 1xx, where 1 indicates FIG. 1 and xx designates the unique element.

It should be understood that any reference to an element in this disclosure using a designation such as "first," "second," and so forth does not limit the quantity or order of those elements, unless such limitation is explicitly stated. Rather, these designations may be used in this disclosure as a convenient method of distinguishing between two or more elements or instances of an element. A reference to a first and second element does not mean that only two elements may be employed or that the first element must precede the second element. In addition, unless stated otherwise, a set of elements may comprise one or more elements.

Reference throughout this specification to "one embodiment", "an embodiment" or similar language means that a particular feature, structure, or characteristic described in the embodiment is included in at least one embodiment of the present invention. Appearances of the phrases "one embodiment", "an embodiment" and similar language throughout this specification may, but do not necessarily, all refer to the same embodiment.

In the following detailed description, reference is made to the illustrations, which form a part of the present disclosure, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations in this disclosure are not meant to be actual views of any particular device or system but are merely idealized representations employed to describe embodiments of the present disclosure. And the illustrations presented are not necessarily drawn to scale. And, elements common between drawings may retain the same or have similar numerical designations.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural).

Also, as used in the description herein, the meaning of "in" includes "in" and "on" unless the context clearly dictates otherwise.

To aid any Patent Office and any readers of any patent issued on this disclosure in interpreting the included claims, the Applicant(s) wish to note that they do not intend any of the appended claims or claim elements to invoke 35 U.S.C. 112(f) unless the words "means for" or "step for" are explicitly used in the particular claim.

Figure 2:
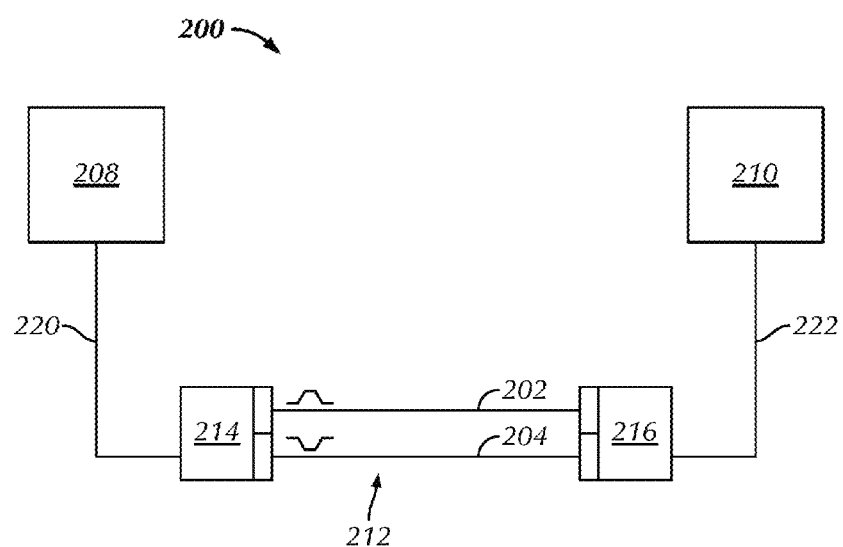
FIG. 2 illustrates a transmission system according to an embodiment of the present disclosure that illustrates transmitting information between two devices.

FIG. 2 illustrates a transmission system 200 according to an embodiment of the present disclosure that illustrates transmitting information and/or control data signals between two devices. The transmission system 200 shows a transmission cable 212 with multiple conductors (i.e. wires) used to carry an information and/or control data signal between devices 208 and 210. Device 208 can be for example a control system with one or more processors, memory, and/or storage that performs some task. Device 210 can be for example another control system, sensor, or the like that may include one or more processors, memory, and/or storage or other types of target device. Device 208 sends an information and/or control data signal 220 to transmitter circuit 214. Transmitter circuit 214 transforms or converts the data signal 220 from device 208 into a differential signal and sends the data signal to receiver circuit 216 using transmission cable 212. Conductor 202 is the positive leg of the differential signal. Conductor 204 is the negative leg of the differential signal. The data signal is transmitted through the conductors in a manner described in further embodiments as described elsewhere in this disclosure. Receiver circuit 216 receives the differential signal and transforms or converts it back to the information and/or control data signal 222 and sends to device 210.

Figure 3:
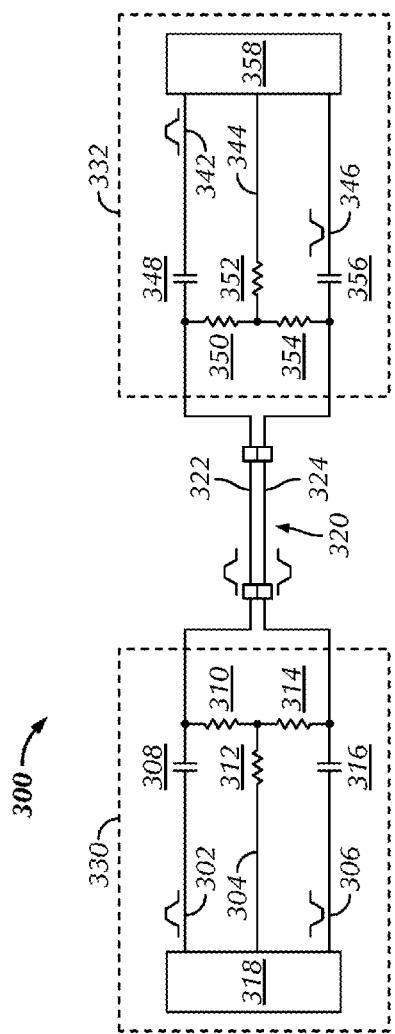
FIG. 3 discloses a transmission cable with an information and/or control data signal according to an embodiment of the present disclosure.

FIG. 3 discloses a system 300 with a transmission cable 320 with an information and/or control data signal according to an embodiment of the present disclosure. In this embodiment, a passive resistor network 310, 312, 314 and combined with AC coupling capacitors 308, 316 are used to transform an information signal 304 into a common mode voltage on the individual branches of a balanced differential pair at the source. A second passive resistor network 350, 354, 352 and AC coupling capacitors 348, 356 are used to transform the common mode voltage of the differential pair 342, 346 back to an information signal 344. This allows the data signal to travel on the differential pair 322, 324 eliminating the need for a separate conductor in the transmission cable 320. The transmission system 300 illustrates a transmission cable 320 with multiple conductors 322, 324 used to carry the information and/or control data signal between a first device (not shown) and a second device (not shown). The first device can be for example a control system with one or more processors, memory, and/or storage that performs some task. The second device can be for example another control system, sensor, or the like that may include one or more processors, memory, and/or storage or other types of the target device. The first device sends the data signal to transmitter circuit 330 through a first interface 318. Transmitter circuit 330 transforms or converts the data signal 304 from the first device into a differential signal and sends the information and/or control signal to receiver circuit 332 using transmission cable 320. Conductor 322 is the positive leg of the differential signal. Conductor 324 is the negative leg of the differential signal. The passive resistor network 310, 312, 314 and AC coupling capacitors 308, 316 are used to transform the information signal 304 into a common mode voltage on the individual branches of a balanced differential pair. Receiver circuit 332 receives the differential signal and transforms or converts it back to the data signal 344 and sends to the second device (not shown). The receiver circuit 332 uses the second passive resistor network 350, 354, 352 and AC coupling capacitors 348, 356 to transform the common mode voltage of the differential pair 342, 346 back to the data signal 344. The data signal 344 passes through the second interface 358 of receiver circuit 332 to the second device (not shown). One embodiment of this disclosure can be used as in an audio application where the POS positive 322 and NEG negative 324 differential lines, could carry an audio signal. The data signal could be, for example, a Quadrature Amplitude Modulated (QAM) signal carrying encoded still pictures or video, assuming the images or video is used in an application that is relatively insensitive to noise introduced on the data signal conductor. Alternatively, the data signal could carry an encoded representation of the position of a microphone relative to a pre-set or computed reference point, or a sensor. The data signal might, for example, carry ultrasonic sonar data representing a sonic image of the position of the parts of a user's face relative to the microphone that is capturing and transmitting that user's speech over the conductor's differential pairs in order to, for example, help to render a more accurate avatar of that user at the far end of a conference.

Figure 4:
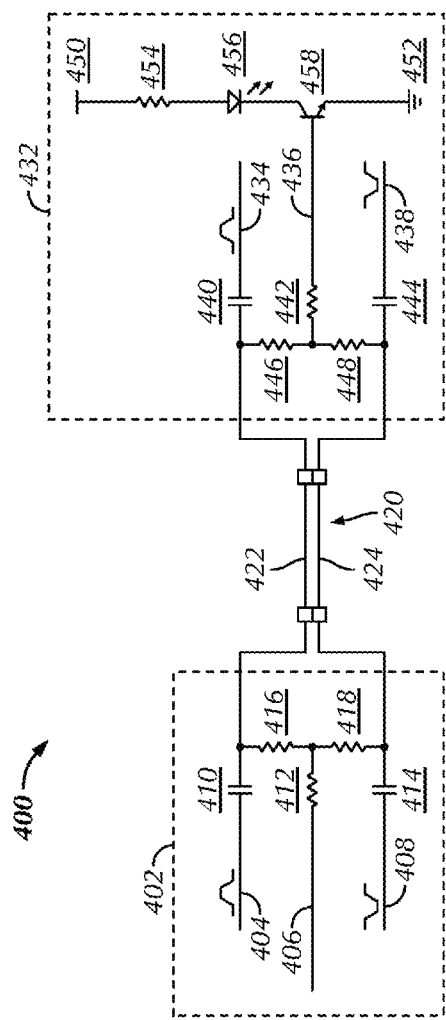
FIG. 4 discloses a CAN Bus twisted wire pair with an information and/or control data signal according to an embodiment of the present disclosure.

FIG. 4 discloses a CAN Bus twisted wire pair 420 that conveys an information and/or control data signal according to an embodiment 400 of the present disclosure. This embodiment could be an automotive application where the differential signal 420 could carry, for example, data encoded using a well-known industry standard, like CAN bus. The information and/or control data signal could represent automotive data like the tire pressure of the car being monitored. Since that is normally a slowly varying parameter, the data signal could be filtered at the receiving end to eliminate noise introduced on the conductor. The differential signal could carry the position of the accelerator pedal, since that needs to be transmitted in a more robust, and error-free environment. In this embodiment 400, a passive resistor network 416, 412, 418 and combined with AC coupling capacitors 410, 414 are used to transform the automotive data signal 406 into a common mode voltage on the individual branches of a balanced differential pair 404, 408 at the source. A second passive resistor network 446, 442, 448 and AC coupling capacitors 440, 444 are used to transform the common mode voltage of the differential pair 422, 424 back to the data signal 436. This allows the data signal to travel on the differential pair 422, 424 eliminating the need for a separate conductor in the transmission cable 420. The system 400 shows a transmission cable 420 with multiple conductors 422, 424 used to carry the data signal between a first device such as a tire pressure sensor (not shown) and a second device such as a warning light. The first device can be for example an automotive control system or a tire pressure sensor with one or more processors, memory, and/or storage that performs some task. The second device can be for example another control system, sensor, or warning light, or the like that may include one or more processors, memory, and/or storage or other types of target device such as a warning light. The first device sends the data signal to the transmitter circuit 402 through a first interface (not shown). The transmitter circuit 402 transforms or converts the data signal 406 from the first device into a differential signal and sends the data signal to the receiver circuit 432 using the transmission cable 420. Conductor 422 is the positive leg of the differential signal. Conductor 424 is the negative leg of the differential signal. The passive resistor network 416, 418, 412 and AC coupling capacitors 410, 414 are used to transform the information signal 406 into a common mode voltage on the individual branches of a balanced differential pair. The receiver circuit 432 receives the differential signal 434, 438 and transforms or converts it back to the data signal 436 and sends to the warning light system that includes light 456, transistor 458, with resistor 454, and voltage 450 and ground 452. The receiver circuit 432 uses the second passive resistor network 446, 442, 448 and AC coupling capacitors 440, 444 to transform the common mode voltage of the differential pair 422, 424 back to the data signal 436.

Figure 5:
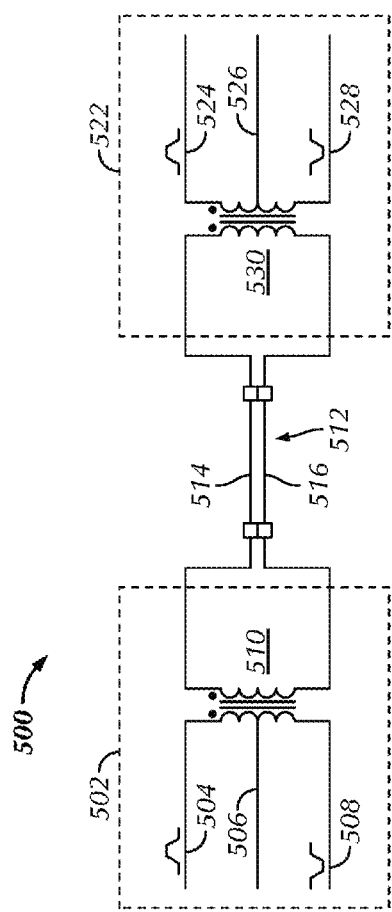
FIG. 5 discloses a center tapped transformer used to transform an information and/or control data signal according to an embodiment of the present disclosure.

FIG. 5 discloses an embodiment 500 of the present disclosure that uses a center-tapped transformer 510, 530 to transform an information and/or control data signal 506, 526 into and from a common mode voltage on the individual branches of a balanced differential pair 504, 508 and 525, 528 at the source transmitter circuit 502 and receiver destination circuit 522. This embodiment is useful in noisy environments or systems with a lot of Electromechanical Frequency Interference (EFI). In this embodiment 500, a center-tapped transformer 510 is used to transform an information and/or control data signal 506 into a common mode voltage on the individual branches of a balanced differential pair 504, 508 at the source. A second center-tapped transformer 530 is used to transform the common mode voltage of the differential pair 524, 528 back to the data signal 526. This allows the data signal to travel on the differential pair 514, 516 eliminating the need for a separate conductor in the transmission cable 512. The transmission system 500 shows a transmission cable 512 with multiple conductors 514, 516 used to carry the data signal between a first device (not shown) and a second device (not shown). The first device can be for example a control system with one or more processors, memory, and/or storage that performs some task. The second device can be for example another control system, sensor, or the like that may include one or more processors, memory, and/or storage or other types of the target device. The first device sends the data signal to the transmitter circuit 502. The transmitter circuit 502 transforms or converts the data signal 506 from the first device into a differential signal and sends the data signal to the receiver circuit 522 using the transmission cable 512. Conductor 514 is the positive leg of the differential signal. Conductor 516 is the negative leg of the differential signal. The center-tapped transformer 530 is used to transform the data signal 526 into a common mode voltage on the individual branches of a balanced differential pair. Receiver circuit 522 receives the differential signal and transforms or converts it back to the data signal 526 and sends to the second device.

Figure 6:
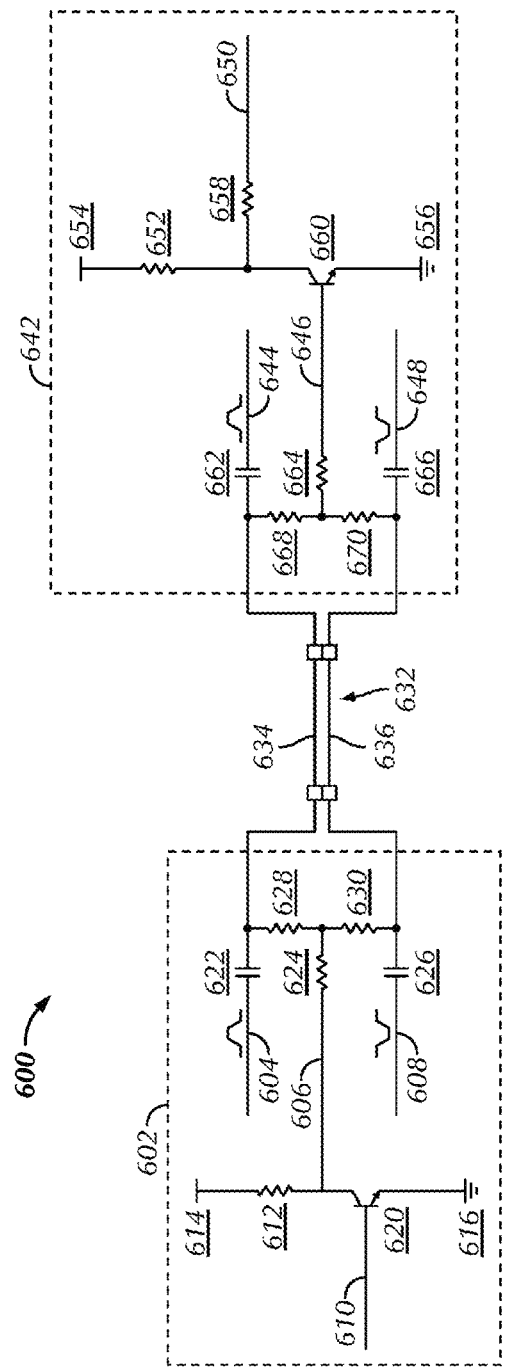
FIG. 6 discloses a passive network with driver transistor used to transform an information and/or control data signal according to an embodiment of the present disclosure.

FIG. 6 discloses a passive network with driver transistor used convey an information and/or control data signal according to an embodiment of the present disclosure. This embodiment 600 of the disclosure could also incorporate driver transistors 620 as illustrated to ensure the voltage drop on the cable 620 can allow the information and/or control data signal 610, 650 to be recovered at the receiving end. VCC1 614 is a voltage selected to ensure the voltage drop across the cable does not fall below the threshold required for Vbe of transistor 620 to conduct. The expected voltage drop can easily be calculated based on the conductor selected and the load current expected. VCC2 654 is the system voltage of the receiving circuit 642. The system 600 shows a transmission cable 632 with multiple conductors 634, 636 used to carry the data signal between a first device (not shown) that couples to a transmitter circuit 602 and a second device (not shown) that couples to a receiver circuit

642. The first device can be for example a control system with one or more processors, memory, and/or storage that performs some task. The second device can be for example another control system, sensor, or the like that may include one or more processors, memory, and/or storage or other types of the target device. The first device sends the data signal to the transmitter circuit 602 through a first interface. The transmitter circuit 602 transforms or converts the data signal 610 from the first device into a differential signal and sends the data signal to the receiver circuit 642 using the transmission cable 632. Conductor 634 is the positive leg of the differential signal. Conductor 636 is the negative leg of the differential signal. In this embodiment 600, the source transmitter circuit 602 has a passive resistor network 624, 628, 630 and combined with AC coupling capacitors 622, 626 are used to transform the data signal 606 into a common mode voltage on the individual branches of a balanced differential pair 604, 608 at the source. This embodiment features a driver transistor circuit 620 to provide a proper voltage drop at the receiver. The data signal 610 received from a first device passes through transistor 620 with VCC1 614, resistor 612, and ground 616. The receiver circuit 642 has a second passive resistor network 664, 668, 670 and AC coupling capacitors 662, 666 that are used to transform the common mode voltage of the differential pair 644, 648 back to data signal 646. This allows the data signal to travel on the differential pair 634, 636 eliminating the need for a separate conductor in the transmission cable 632. The data signal 646 passes through transistor 660 with VCC2 654, resistor 652, and ground 656 to produce the data signal 650 that is conveyed to the second device.

Figure 7:
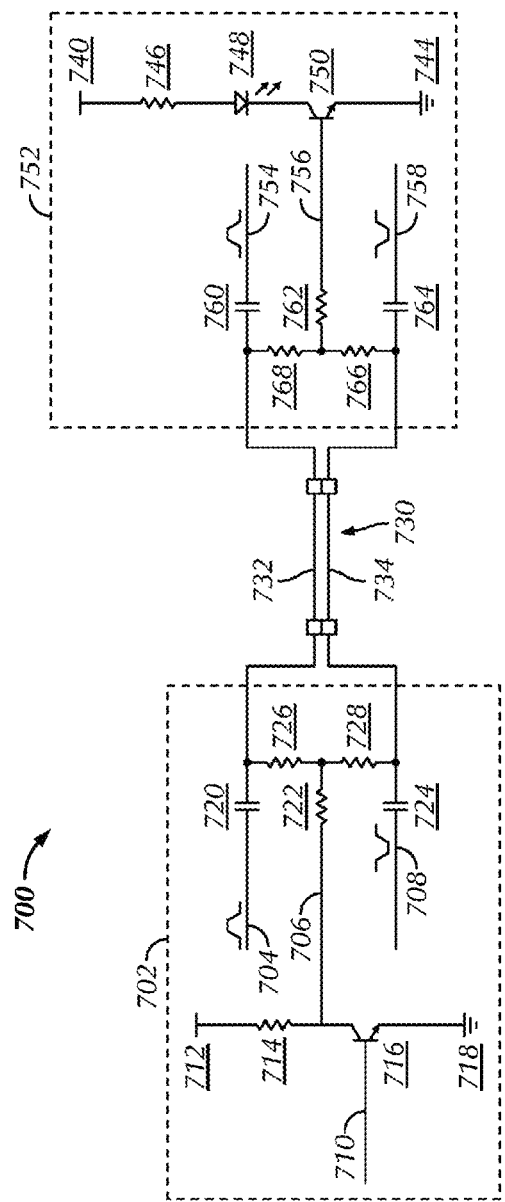
FIG. 7 discloses an analog audio network with driver transistor used to drive analog LED control signal according to an embodiment of the present disclosure.

FIG. 7 discloses an analog audio network 700 with driver transistor used to drive the analog LED control signal according to an embodiment of the present disclosure. Another embodiment of the disclosure could also send a common mode GPIO signal across differential analog audio to drive a remote LED 748 as illustrated. The driver transistor 716 ensures the voltage drop on the cable can allow the LED signal 756 to be recovered at the receiving circuit 752. VCC1 712 is a voltage selected to ensure the voltage drop across the cable does not fall below the threshold required for Vbe of transistor 716 to conduct and pass the signal through. The expected voltage drop can easily be calculated based on the conductor selected and the load current expected. VCC2 740 is the system voltage of the receiver circuit 752. The system 700 shows a transmission cable 730 with multiple conductors 732, 734 used to carry an information and/or control data signal between a first device (not shown) that couples to a transmitter circuit 702 and a second device such as an LED light circuit that is included with receiver circuit 752. The first device can be for example a control system with one or more processors, memory, and/or storage that performs some task. The second device can be for example any type of light display. The first device sends the data signal to the transmitter circuit 702 through a first interface. The transmitter circuit 702 transforms or converts the data signal 710 from the first device into a differential signal and sends the data signal to the receiver circuit 752 using the transmission cable 730. Conductor 732 is the positive leg of the differential signal. Conductor 734 is the negative leg of the differential signal. In this embodiment 700, the source transmitter circuit 702 has a passive resistor network 722, 726, 728 and combined with AC coupling capacitors 720, 724 are used to transform the data signal 706 into a common mode voltage on the individual branches of a balanced differential pair 704, 708 at the source. This embodiment features a driver transistor circuit 716 to provide a proper voltage drop at the receiver circuit 752. The information signal 710 received from the first device passes through transistor 716 with VCC1 712, resistor 714, and ground 718. The receiver circuit 752 has a second passive resistor network 762, 768, 766 and AC coupling capacitors 760, 764 that are used to transform the common mode voltage of the differential pair 754, 758 back to data signal 756. This allows the data signal to travel on the differential pair 754, 758 eliminating the need for a separate conductor in the transmission cable 730. The information signal 756 controls LED 748 through transistor 750 with VCC2 740, resistor 746, and ground 744 to display the proper information conveyed to the LED.

Figure 8:
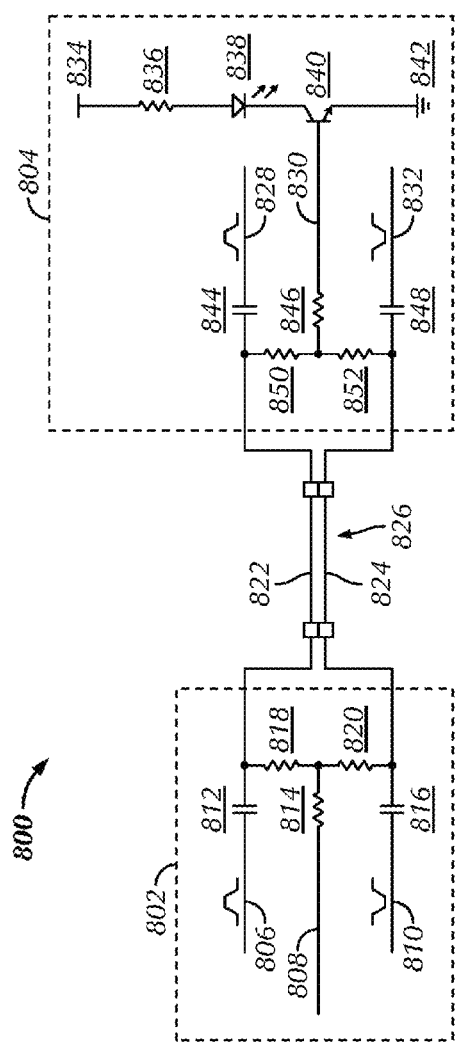
FIG. 8 discloses a digital audio network used to drive LED control signal according to an embodiment of the present disclosure.

FIG. 8 discloses a digital audio network 800 used to drive the LED control signal according to an embodiment of the present disclosure. Another embodiment of this disclosure can be used in balanced digital audio applications to drive a remote LED 840 as illustrated. The system 800 shows a transmission cable 826 with multiple conductors 822, 824 used to carry digital audio signals between a first device (not shown) that couples to a transmitter circuit 802 and a second device such as an LED light circuit that is included with receiver circuit 804. The first device can be for example a control system with one or more processors, memory, and/or storage that performs some task including processing digital audio. The second device can be for example any type of light display. The first device sends the signal to the transmitter circuit 802 through a first interface (not shown). The transmitter circuit 802 transforms or converts the data signal 808 from the first device into a differential signal and sends the data signal to the receiver circuit 804 using the transmission cable 826. Conductor 822 is the positive leg of the differential signal. Conductor 824 is the negative leg of the differential signal. In this embodiment 800, the source transmitter circuit 802 has a passive resistor network 814, 818, 820 and combined with AC coupling capacitors 812, 816 are used to transform the data signal 808 into a common mode voltage on the individual branches of a balanced differential pair 806, 810 at the source. The receiver circuit 804 has a second passive resistor network 846, 850, 852 and AC coupling capacitors 844, 848 that are used to transform the common mode voltage of the differential pair 828, 832 back to data signal 830. This allows the data signal to travel on the differential pair 822, 824 eliminating the need for a separate conductor in the transmission cable 826. The data signal 830 controls LED 838 through transistor 840 with VCC2 834, resistor 836, and ground 842 to display the proper information conveyed to the LED.

While the present disclosure has been described in this disclosure regarding certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirit, or its essential characteristics as claimed along with their legal equivalents. In addition, features from one embodiment may be combined with features of another embodiment while still being encompassed within the scope of the invention as contemplated by the inventor. The described embodiments are to be considered only as illustrative and not restrictive. All changes which come within the meaning and range of equivalency of the claims are to be embraced within their scope. Disclosing the present invention is exemplary only, with the true scope of the present invention being determined by the included claims.

The invention claimed is:

1. An apparatus that sends a data signal as a common mode voltage signal on a single balanced differential signal pair, comprising:
   the data signal;
   a single balanced differential signal pair of conductors that includes a positive and a negative differential conductor;
   a first network of circuits that transforms the data signal into a common mode voltage signal on the individual conductors of the single balanced differential signal pair of conductors where the positive conductor is a positive leg of the differential signal and the negative conductor is a negative leg of the differential signal;
   the transformed data signal is transmitted as a common mode voltage signal over the single balanced differential signal pair of conductors where the positive conductor is the positive leg of the differential signal and the negative conductor is the negative leg of the differential signal; and
   a second network of circuits that transforms the transformed data signal from the common mode voltage signal on the individual conductors of the single balanced differential signal pair of conductors back to the data signal;
   where the first network of circuits couples to the second network of circuits via the single balanced differential signal pair of conductors.

2. The claim according to claim 1 where the first network of circuits and/or the second network of circuits includes a passive resistor network combined with Alternating Current (AC) coupling capacitors.

3. The claim according to claim 1 where the first network of circuits and/or the second network of circuits includes a center-tapped transformer.

4. The claim according to claim 1 where the data signal is a Quadrature Amplitude Modulated (QAM) signal.

5. The claim according to claim 1 where the data signal is a General Purpose Input/Output (GPIO) signal.

6. The claim according to claim 1 where the first network of circuits and/or the second network of circuits includes a semiconductor device that includes a passive resistor network combined with AC coupling capacitors.

7. The claim according to claim 1 where the first network of circuits and/or the second network of circuits includes a semiconductor device that includes a center-tapped transformer.

8. The claim according to claim 1 where the data signal is a DC or AC signal.

9. A method to make an apparatus that is sending a data signal as a common mode voltage signal on a single balanced differential signal pair, comprising:
   providing a single balanced differential signal pair of conductors that includes a positive and a negative differential conductor that carries the data signal;
   providing a first network of circuits that transforms the data signal into a common mode voltage signal on the individual conductors of the single balanced differential signal pair of conductors where the positive conductor is the positive leg of the differential signal and the negative conductor is the negative leg of the differential signal;
   the transformed data signal is transmitted as a common mode voltage signal over the single balanced differential signal pair of conductors where the positive conductor is a positive leg of the differential signal and the negative conductor is a negative leg of the differential signal; and
   coupling a second network of circuits to the first network of circuits via the single balanced differential signal pair of conductors;
   where the second network of circuits transforms the transformed data signal from the common mode voltage signal on the individual conductors of the single balanced differential signal pair of conductors back to the data signal.

10. The claim according to claim 9 where the first network of circuits and/or the second network of circuits includes a passive resistor network combined with Alternating Current (AC) coupling capacitors.

11. The claim according to claim 9 where the first network of circuits and/or the second network of circuits includes a center-tapped transformer.

12. The claim according to claim 9 where the data signal is a Quadrature Amplitude Modulated (QAM) signal.

13. The claim according to claim 9 where the data signal is a General Purpose Input/Output (GPIO) signal.

14. The claim according to claim 9 where the first network of circuits and/or the second network of circuits includes a semiconductor device that includes a passive resistor network combined with AC coupling capacitors.

15. The claim according to claim 9 where the first network of circuits and/or the second network of circuits includes a semiconductor device that includes a center-tapped transformer.

16. The claim according to claim 9 where the data signal is a DC or AC signal.

17. A method to use an apparatus that is sending a data signal as a common mode voltage signal on a single differential signal pair, comprising:
   providing the data signal that is carried by a single balanced differential signal pair of conductors that includes a positive and a negative differential conductor;
   transforming the data signal into a common mode voltage signal on the individual conductors of the single balanced differential signal pair of conductors where the positive conductor is a positive leg of the differential signal and the negative conductor is a negative leg of the differential signal with a first network of circuits;
   transmitting the transformed data signal as a common mode voltage signal over the single balanced differential signal pair of conductors where the positive conductor is the positive leg of the differential signal and the negative conductor is the negative leg of the differential signal; and
   transforming the transformed data signal from the common mode voltage signal on the individual conductors of the single balanced differential signal pair of conductors back to the data signal with a second network of circuits;
   where the first network of circuits couples to the second network of circuits via the single balanced differential signal pair of conductors.

18. The claim according to claim 17 where the first network of circuits and/or the second network of circuits includes a passive resistor network in combination with Alternating Current (AC) coupling capacitors.

19. The claim according to claim 17 where the first network of circuits and/or the second network of circuits includes a center-tapped transformer.

20. The claim according to claim 17 where the data signal is Quadrature Amplitude Modulated (QAM) signal.

21. The claim according to claim 17 where the data signal is a General Purpose Input/Output (GPIO) signal.

22. The claim according to claim 17 where the first network of circuits and/or the second network of circuits includes a semiconductor device that includes a passive resistor network combined with AC coupling capacitors.

23. The claim according to claim 17 where the first network of circuits and/or the second network of circuits includes a semiconductor device that includes a center-tapped transformer.

24. The claim according to claim 17 where the data signal is a DC or AC signal.

25. A non-transitory program storage device readable by a computing device that tangibly embodies a program of instructions executable by the computing device to perform a method to use an apparatus that is sending a data signal as a common mode voltage signal on a single differential signal pair, comprising:
　providing the data signal that is carried by a single balanced differential signal pair of conductors that includes a positive and a negative differential conductor;
　transforming the data signal into a common mode voltage signal on the individual conductors of the single balanced differential signal pair of conductors where the positive conductor is a positive leg of the differential signal and the negative conductor is a negative leg of the differential signal with a first network of circuits;
　transmitting the transformed data signal as a common mode voltage signal over the single balanced differential signal pair of conductors where the positive conductor is the positive leg of the differential signal and the negative conductor is the negative leg of the differential signal; and
　transforming the transformed data signal from the common mode voltage signal on the individual conductors of the single balanced differential signal pair of conductors back to the data signal with a second network of circuits;
　where the first network of circuits couples to the second network circuits via the single balanced differential signal pair of conductors.

26. The claim according to claim 25 where the first network of circuits and/or the second network of circuits includes a passive resistor network combined with Alternating Current (AC) coupling capacitors.

27. The claim according to claim 25 where the first network of circuits and/or the second network of circuits includes a center-tapped transformer.

28. The claim according to claim 25 where the data signal is a Quadrature Amplitude Modulated (QAM) signal.

29. The claim according to claim 25 where the data signal is a General Purpose Input/Output (GPIO) signal.

30. The claim according to claim 25 where the first network of circuits and/or the second network of circuits includes a semiconductor device that includes a passive resistor network combined with AC coupling capacitors.

31. The claim according to claim 25 where the first network of circuits and/or the second network of circuits includes a semiconductor device that includes a center-tapped transformer.

32. The claim according to claim 25 where the data signal is a DC or AC signal.

33. An apparatus that sends a data signal as a common mode voltage signal on a single differential signal pair, comprising:
　the data signal that is carried by a signal balanced differential signal pair of conductors that includes a positive and a negative differential conductor;
　means for transforming the data signal into a common mode voltage signal on the individual conductors of the single balanced differential signal pair of conductors where the positive conductor is a positive leg of the differential signal and the negative conductor is a negative leg of the differential with a first network of circuits;
　means for transmitting the transformed data signal as a common mode voltage signal over the single balanced differential signal pair of conductors where the positive conductor is the positive leg of the differential signal and the negative conductor is the negative leg of the differential signal; and
　means for transforming the transformed data signal from the common mode voltage signal on the individual conductors of the single balanced differential signal pair of conductors back to the data signal with a second network of circuits;
　wherein the fist network of circuits couples to the second network of circuits via the single balanced differential signal pair of conductors.

34. The claim according to claim 33 where the first network of circuits and/or the second network of circuits includes a passive resistor network in combination with Alternative Current (AC) coupling capacitors.

35. The claim according to claim 33 where the first network of circuits and/or the second network of circuits includes a center-tapped transformer.

36. The claim according to claim 33 where the data signal is a Quadrature Amplitude Modulated (QAM) signal.

37. The claim according to claim 33 where the data signal is a General Purpose Input/Output (GPIO) signal.

38. The claim according to claim 33 where the first network of circuits and/or the second network of circuits includes a semiconductor device that includes a passive resister network combined with AC coupling capacitors.

39. The claim according to claim 33 where the first network of circuits and/or the second network of circuits includes a semiconductor device that includes a center-trapped transformer.

40. The claim according to claim 33 where the data signal is a DC or AC signal.

* * * * *